United States Patent
Yoshida et al.

(10) Patent No.: US 11,022,224 B2
(45) Date of Patent: Jun. 1, 2021

(54) VALVE DEVICE, FLOW CONTROL METHOD USING THE SAME, AND SEMICONDUCTOR MANUFACTURING METHOD

(71) Applicant: FUJIKIN INCORPORATED, Osaka (JP)

(72) Inventors: Toshihide Yoshida, Osaka (JP); Tomohiro Nakata, Osaka (JP); Tsutomu Shinohara, Osaka (JP); Toshiyuki Inada, Osaka (JP); Takashi Funakoshi, Osaka (JP); Hidenobu Sato, Osaka (JP); Tomoko Yuhara, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 75 days.

(21) Appl. No.: 16/463,428

(22) PCT Filed: Nov. 2, 2017

(86) PCT No.: PCT/JP2017/039732
§ 371 (c)(1),
(2) Date: May 23, 2019

(87) PCT Pub. No.: WO2018/100968
PCT Pub. Date: Jun. 7, 2018

(65) Prior Publication Data
US 2020/0224776 A1    Jul. 16, 2020

(30) Foreign Application Priority Data
Nov. 30, 2016    (JP) .............................. JP2016-233673

(51) Int. Cl.
*F16K 31/122*    (2006.01)
*F16K 31/00*    (2006.01)
(Continued)

(52) U.S. Cl.
CPC .............. *F16K 7/14* (2013.01); *F16K 31/007* (2013.01); *F16K 31/02* (2013.01); *F16K 31/122* (2013.01);
(Continued)

(58) Field of Classification Search
CPC ....... Y10T 137/7761; F16K 7/14; F16K 7/17; F16K 31/007; F16K 31/1221; F16K 31/1225; G05D 16/2097; H01L 21/205
(Continued)

(56) References Cited

U.S. PATENT DOCUMENTS 5,092,360 A * 3/1992 Watanabe ............. F16K 31/007
137/487.5
5,145,147 A * 9/1992 Nakazawa ............ F16K 31/007
251/11
(Continued)

FOREIGN PATENT DOCUMENTS

JP    H07-217767 A    8/1995
JP    2007-064333 A    3/2007
(Continued)

OTHER PUBLICATIONS

U.S. Appl. No. 16/347,934 to Toshihide Yoshida et al., filed May 7, 2019.
(Continued)

*Primary Examiner* — Matthew W Jellett
(74) *Attorney, Agent, or Firm* — Greenblum & Bernstein, P.L.C.

(57) ABSTRACT

A valve device includes a valve body that defines flow paths, a diaphragm provided so as to be capable of opening and closing the flow paths, an operation member provided so as to be capable of moving in opening and closing directions that open and close the flow paths by operating the diaphragm, a main actuator that applies a driving force corre-
(Continued)

sponding to an operating pressure applied in the opening direction or the closing direction of the opening and closing directions with respect to the operation member, a switching mechanism capable of selectively switching a position of the operation member that regulates a degree of opening of the flow paths between a first open position and a second open position in accordance with a magnitude of the operating pressure, and regulating mechanisms capable of independently regulating the first open position and the second open position.

10 Claims, 13 Drawing Sheets

(51) Int. Cl.
- *G05D 16/20* (2006.01)
- *F16K 7/14* (2006.01)
- *F16K 31/02* (2006.01)
- *H01L 21/205* (2006.01)

(52) U.S. Cl.
CPC ....... *G05D 16/2097* (2019.01); *H01L 21/205* (2013.01); *Y10T 137/7761* (2015.04)

(58) Field of Classification Search
USPC .............. 251/62, 63.4–63.6, 129.03, 129.06; 137/487.5
See application file for complete search history.

(56) References Cited

U.S. PATENT DOCUMENTS

| | | | | |
|---|---|---|---|---|
| 5,865,421 | A * | 2/1999 | Ono | C23C 16/4481 137/341 |
| 6,062,533 | A * | 5/2000 | Kappel | F02M 47/027 239/91 |
| 6,345,803 | B2 * | 2/2002 | Sakurai | F16K 31/007 251/129.06 |
| 8,783,652 | B2 * | 7/2014 | Dinh | H01L 21/02104 251/129.06 |
| 10,132,415 | B2 * | 11/2018 | Tanikawa | F16K 31/122 |
| 2005/0253100 | A1 * | 11/2005 | Yasue | F16K 7/17 251/63 |
| 2020/0041007 | A1 * | 2/2020 | Nakata | F16K 31/122 |

FOREIGN PATENT DOCUMENTS

| | | |
|---|---|---|
| JP | 2007-78144 A | 3/2007 |
| JP | 2016-121776 A | 7/2016 |

OTHER PUBLICATIONS

U.S. Appl. No. 16/519,389 to Tomohiro Nakata et al., filed Jul. 23, 2019.

Int'l Search Report issued in International Bureau of WIPO Patent Application No. PCT/JP2017/039732, dated Jan. 30, 2018.

* cited by examiner

VALVE DEVICE, FLOW CONTROL METHOD USING THE SAME, AND SEMICONDUCTOR MANUFACTURING METHOD

FIELD OF THE INVENTION

The present invention relates to a valve device, a flow control method using this valve device, and a semiconductor manufacturing method.

DESCRIPTION OF THE BACKGROUND ART

In a semiconductor manufacturing process, a fluid control system called an integrated gas system in which various fluid control devices, such as a switch valve, a regulator, and a mass flow controller, are integrated is used to supply an accurately measured process gas to a processing chamber. A box that houses this integrated gas system is called a gas box.

While normally a process gas output from the gas box described above is directly supplied to the processing chamber, in a treatment process that deposits a film on a substrate by atomic layer deposition (ALD), in order to supply a process gas in a stable manner, the process gas supplied from the gas box is temporarily stored in the tank as a buffer, and a valve provided close to the processing chamber is opened and closed at high frequency, supplying the process gas from the tank to the processing chamber in a vacuum atmosphere. Note that, for examples of the valve provided close to the processing chamber, refer to Patent Documents 1 and 2.

The ALD is one type of chemical vapor deposition, and a method in which, under film deposition conditions such as temperature and time, two or more types of process gases are allowed to alternately flow on the substrate surface, one type at a time, and caused to react with atoms on the substrate surface, resulting in the deposition of films, one layer at a time. This method allows control per atom layer, making it possible to form a uniform film thickness and grow the film very finely, even in terms of film quality.

In the semiconductor manufacturing process based on the ALD method, the flow rate of the process gas needs to be higher-precisely regulated and a certain amount of flow rate needs to be secured by increasing a size of a diameter of the substrate, or the like.

PATENT DOCUMENTS

Patent Document 1: Japanese Laid-Open Patent Application No. 2007-64333
Patent Document 2: Japanese Laid-Open Patent Application No. 2016-121776

SUMMARY OF THE INVENTION

Problems to be Solved by the Invention

Conventional valves such as ones described above have designs dedicated to respective specifications of the manufacturing process, and have poor versatility. Further, the conventional valves open and close based on a preset degree of opening, and thus the degree of opening of the valve cannot be changed to control the flow rate of the process gas to a different value while the process is being executed. Furthermore, with the conventional valves in the related art, to regulate the flow rate with higher precision, the pitch of the threads used to regulate the flow rate needs to be narrowed and, for this purpose, the flow regulatable range needs to be sacrificed. Similarly, to further expand the flow regulatable range, a flow regulating accuracy needs to be sacrificed.

An object of the present invention is to provide a valve device capable of regulating a flow rate with higher precision while maintaining a flow regulatable range.

Another object of the present invention is to provide a valve device that achieves an expanded flow regulatable range while maintaining flow regulating accuracy.

Yet another object of the present invention is to provide an openable valve device that can change the degree of opening while executing fluid control.

Yet another object of the present invention is to provide a valve device having an expanded flow control range and improved versatility.

Means for Solving the Problems

A valve device according to the present invention comprises:
 a valve body that defines a flow path;
 a valve element capable of opening and closing the flow path;
 an operation member capable of moving the valve element in opening and closing directions;
 a main actuator that applies a driving force corresponding to an applied operating pressure to the operation member;
 a switching mechanism capable of selectively switching a position of the operation member that regulates aperture degree of opening of the flow path between a first open position and a second open position that differ from each other, in accordance with a magnitude of the operating pressure; and
 a regulating mechanism capable of independently regulating the first open position and the second open position.

Preferably, a configuration can be adopted in which a regulatable range of the first open position and a regulatable range of the second open position of the regulating mechanism partially overlap.

More preferably, a configuration can be adopted in which the regulating mechanism is provided so as to be operable while a fluid is allowed to flow through the flow path.

More preferably, a configuration can be adopted in which the valve element includes a diaphragm, and the operation member positioned at the first open position or the second open position maintains the diaphragm in a corresponding elastically deformed state.

A flow control method of the present invention controls a flow rate of a fluid using the valve device described above.

A semiconductor manufacturing method of the present invention comprises a step of using the valve device described above for flow control of a process gas in a manufacturing process of a semiconductor device that requires a treatment process by the process gas in a sealed chamber.

A fluid control system of the present invention is a fluid control system comprising:
 a plurality of fluid devices, wherein:
 the fluid devices include the valve device having the above-described configuration.

A semiconductor manufacturing system of the present invention includes the valve device having the above-described configuration for control of a process gas in a manufacturing process of a semiconductor device that requires a treatment process by the process gas in a sealed chamber.

Effect of the Invention

According to the present invention, a configuration is adopted in which a switching mechanism of the degree of opening is provided, and the first open position and the second open position are regulatable, making it possible to expand a flow regulatable range while maintaining a flow regulating accuracy, or to regulate a flow rate with higher precision while maintaining the flow regulatable range. Further, the first open position or the second open position is regulated to a preferred position in advance, and the open position to be used is selected by the operating pressure, thereby making it possible to respond to various flow rates, and thus dramatically expand an applicable range and increase a versatility of the device. Furthermore, the regulatable range of the first open position and the regulatable range of the second open position partially overlap, making continual regulation of the degree of opening within an expanded regulating range possible.

According to the present invention, either the first open position or the second open position can be selected by changing the operating pressure, making it possible to easily change the flow rate while executing fluid control.

DESCRIPTION OF THE PREFERRED EMBODIMENTS

Figure 1:
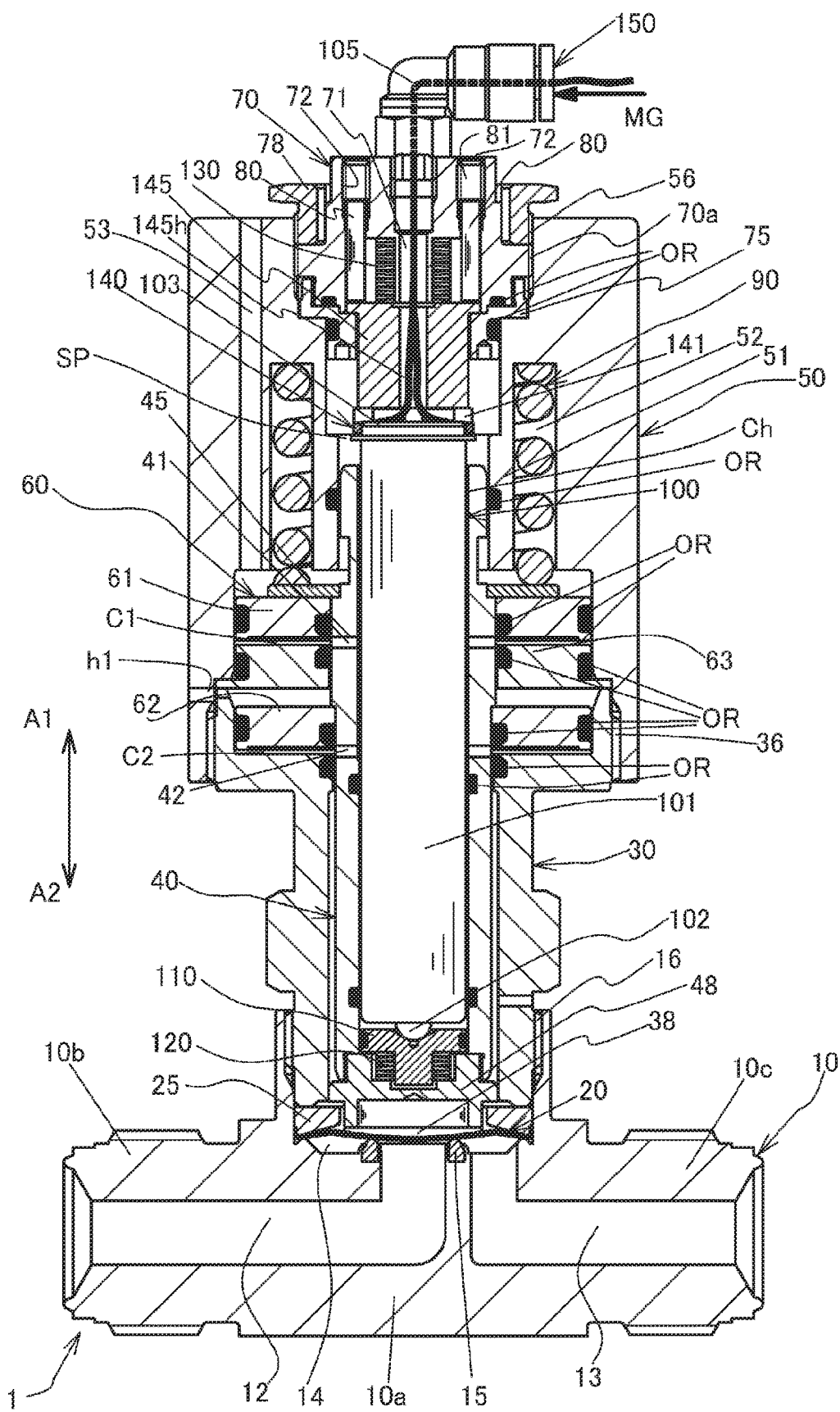
FIG. 1 is a longitudinal sectional view of a valve device according to an embodiment of the present invention.

Embodiments of the present invention are described below with reference to the drawings. Note that, in this specification and the drawings, components having substantially the same function are denoted using the same reference numeral, and duplicate descriptions thereof are omitted.

Figure 2:
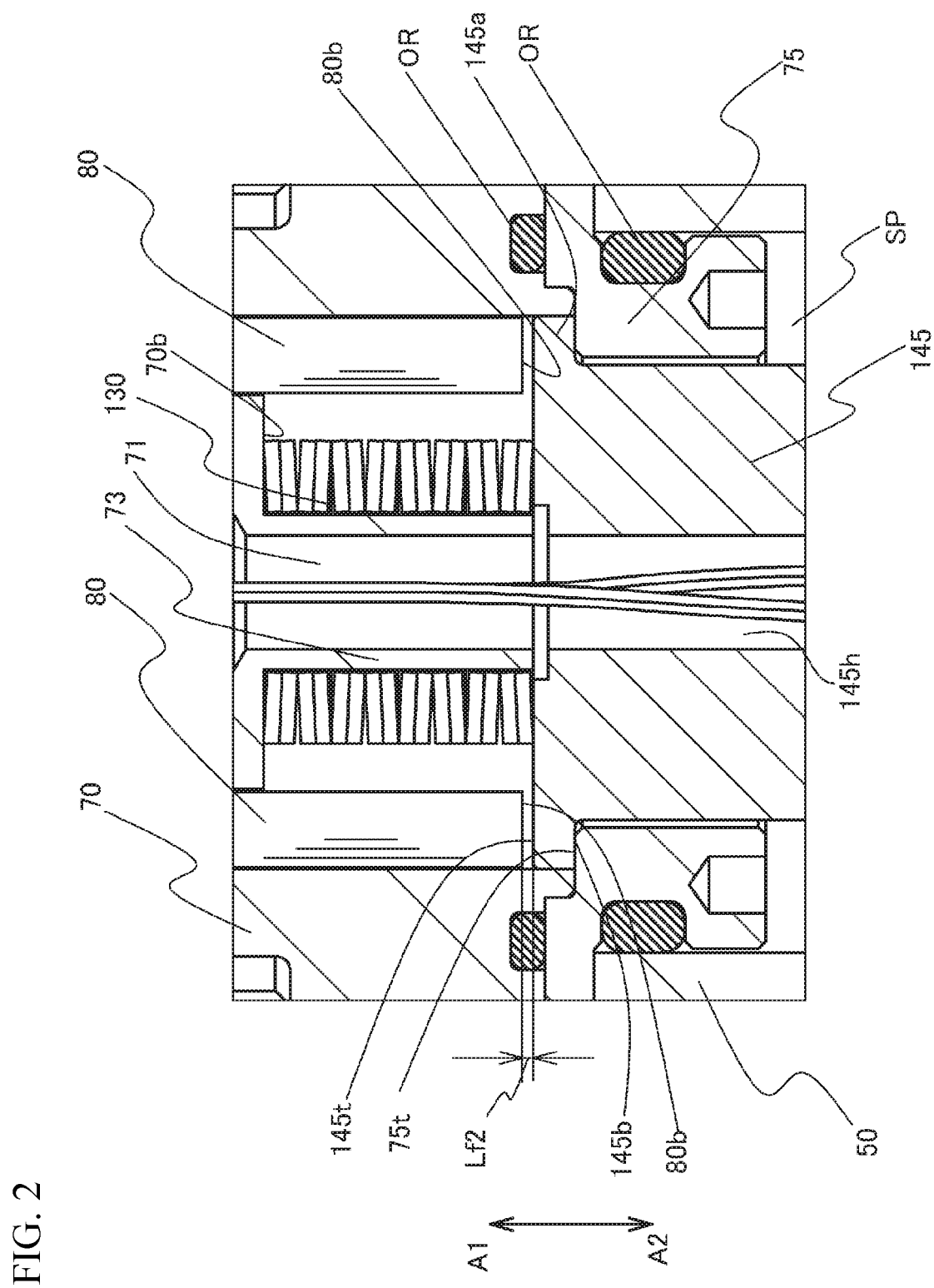
FIG. 2 is an enlarged sectional view of upper side main part of the valve device in FIG. 1, in a closed state.
Figure 3:
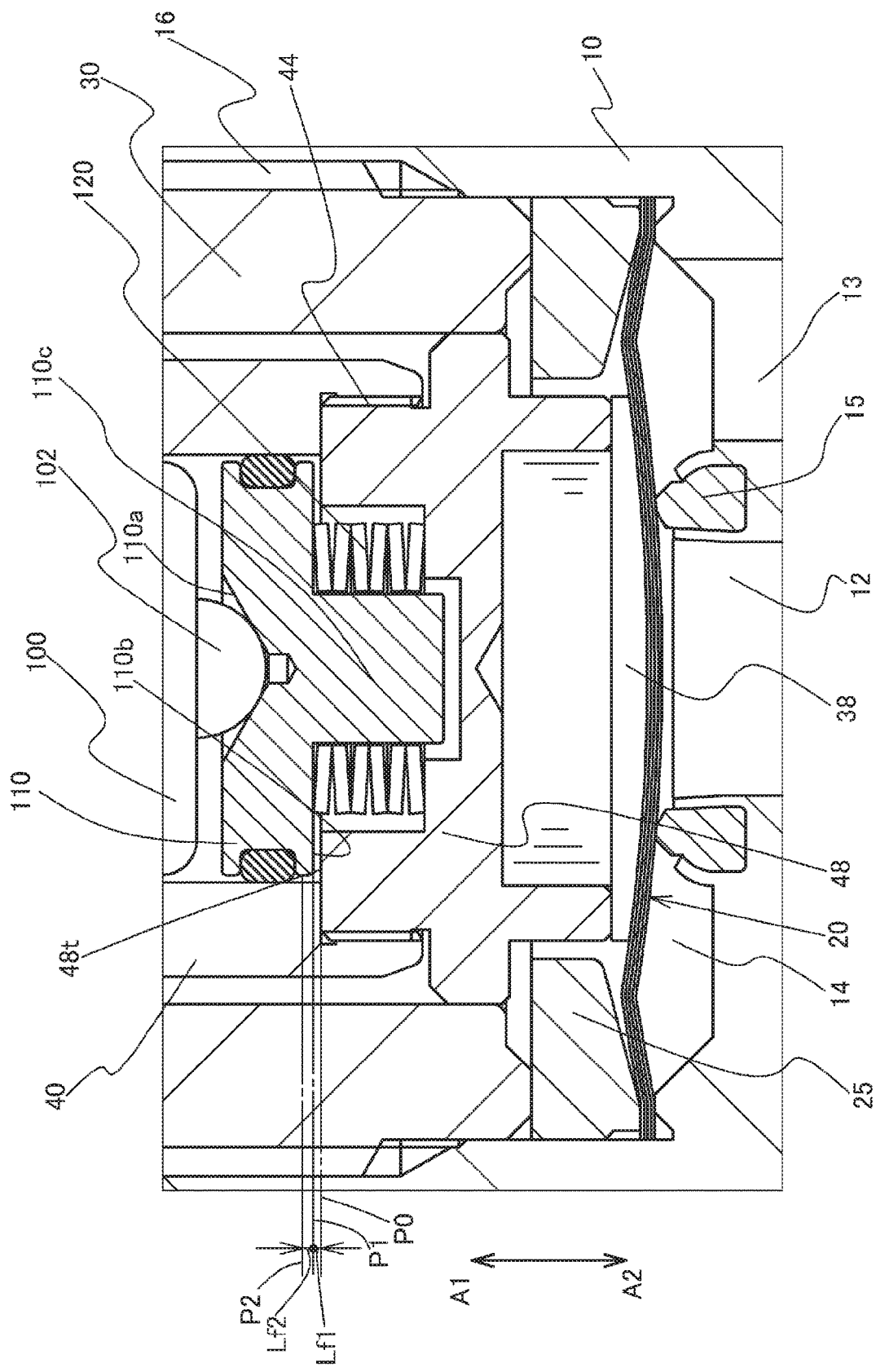
FIG. 3 is an enlarged sectional view of lower side main part of the valve device in FIG. 1, in a closed state.
Figure 4:
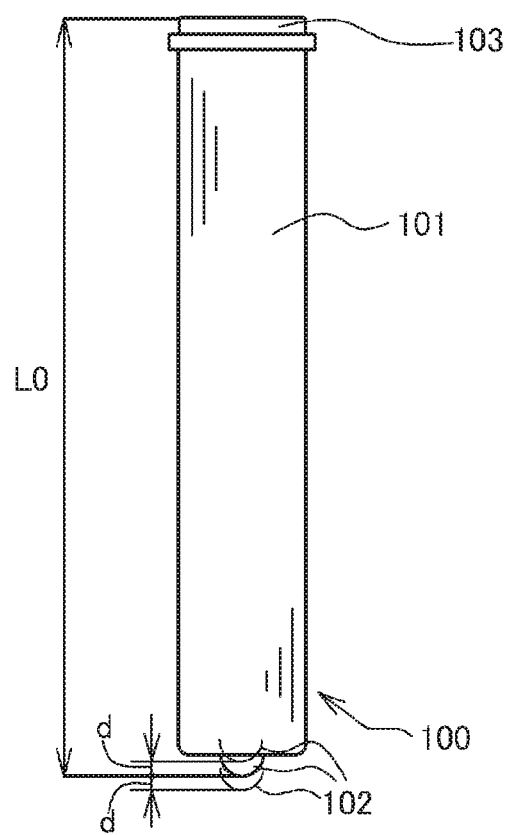
FIG. 4 is an explanatory drawing illustrating an operation of a piezoelectric actuator.

FIG. 1 is a drawing illustrating a configuration of a valve device according to an embodiment of the present invention, and shows the state when the valve is fully closed, FIG. 2 is an enlarged sectional view of upper side main part in FIG. 1, FIG. 3 is an enlarged sectional view of lower side main parts in FIG. 1, and FIG. 4 is a drawing for explaining an operation of a piezoelectric actuator as an actuator for regulating. It should be noted that, in the explanations below, an upward direction is denoted as an opening direction A1, and a downward direction is denoted as a closing direction A2.

In FIG. 1, 1 denotes a valve device, 10 denotes a valve body, 15 denotes a valve seat, 20 denotes a diaphragm as a valve element, 38 denotes a diaphragm presser, 30 denotes a bonnet, 40 denotes an operation member, 50 denotes a casing, 60 denotes a main actuator, 70 denotes a regulating cap, 78 denotes an lock nut, 80 denotes a regulating rod, 90 denotes a coil spring, 100 denotes a piezoelectric actuator, 110 denotes an actuator receiver, 120, 130 each denotes a disc spring, 140 denotes an actuator presser, 145 denotes a disc spring receiver, 75 denotes a regulating body, 150 denotes a pipe joint, OR denotes an O-ring as a seal member, and an MG denotes an operation gas.

The valve body 10 is formed of stainless steel, comprises a valve body main unit 10a having a block shape, and connecting parts 10b, 10c respectively protruding from the sides of the valve body main unit 10a, and defines flow paths 12, 13. One end of each of the flow paths 12, 13 opens at a respective end surface of the connecting parts 10b, 10c, and the other end communicates with a valve chamber 14 having a recessed shape opening upward. On a bottom surface of the valve chamber 14, the valve seat 15 made of a synthetic resin (such as perfluoroalkoxy alkane (PFA), polyamide (PA), polyimide (PI), or polychlorotrifluoroethylene (PCTFE)) is fitted and fixed to a mounting groove provided to an opening peripheral edge on the other end side of the flow path 12. Note that, in this embodiment, as is clear in FIG. 3, the valve seat 15 is fixed in the mounting groove by swaging. It should be noted that, for the valve seat 15, a valve seat made of a metal (special use stainless steel (SUS), or the like) may be used, or a portion of the valve body 10 may be used as the valve seat. In this case, a dimensional change of the valve seat caused by temperature changes, and a dimensional change caused by stress applied to the valve seat are alleviated, making higher-precision aperture regulation possible.

The diaphragm 20 is a valve element provided so as to be capable of opening and closing the flow paths 12, 13 of the valve body 10, is arranged above the valve seat 15 holds an air-tightness of the valve chamber 14, and opens and closes the flow paths 12, 13 by a center portion thereof moving up and down and being brought into contact with and separating from the valve seat 15. In this embodiment, the diaphragm 20, formed by swelling center portions of a thin plate made of a metal such as special stainless steel, and a nickel and cobalt alloy thin plate upward, has a spherical shell shape in which an upwardly convex arc shape is the natural state. The diaphragm 20 is configured by laminating three special stainless steel thin plates, and one nickel and cobalt alloy thin plate.

The diaphragm 20 is mounted on a protruding portion of an inner peripheral surface of the valve chamber 14 at the peripheral edge portion thereof, and by screwing a lower end portion of the bonnet 30 inserted into the valve chamber 14 into a thread part 16 of the valve body 10, the diaphragm 20 is pressed to the protruding portion side of the valve body 10 via a pressing adapter 25 made of a stainless alloy, and fixed in an airtight state. Note that the nickel and cobalt alloy thin film is disposed on a contact gas side.

It should be noted that a valve element having another configuration can also be used.

The operation member 40 is a member for operating the diaphragm 20 so as to make the diaphragm 20 open and close the flow paths 12, 13, and is formed into a substantially cylindrical shape, and fixed by screwing a disc spring receiver 48 into a thread part 44 formed on an inner peripheral surface on a lower end side (refer to FIG. 3). The operation member 40 is open on an upper end side, is fitted to an inner peripheral surface of the bonnet 30 and an inner peripheral surface of a tubular part 51 formed in the casing 50, and is moveably supported in an up-down direction. Note that A1, A2 indicated in FIG. 1 to FIG. 3 are opening and closing directions of the operation member 40, A1 denotes the opening direction and A2 denotes the closing direction. While, in this embodiment, the upward direction and the downward direction with respect to the valve body 10 are the opening direction A1 and the closing direction A2, respectively, the present invention is not necessarily limited thereto.

The coil spring 90 is provided between the casing 50 and an upper surface of a spring receiving plate 45 having a circular shape and fixed on an outer peripheral surface of the operation member 40, and the operation member 40 is continually pressed in the closing direction A2 by the coil spring 90. Thus, as illustrated in FIG. 2, when the main actuator 60 is not activated, the diaphragm 20 is pressed against the valve seat 15, and the area between the flow paths 12, 13 is closed. Note that the spring receiving plate 45 may be integrated with or separated from the operation member 40.

The diaphragm presser 38, that is made of a synthetic resin such as polyimide and comes into contact with a center upper surface of the diaphragm 20, is mounted on the lower end surface of the disc spring receiver 48. Note that the diaphragm presser 38 may be made of a metal such as SUS or an aluminum alloy, and may be integrated with the disc spring receiver 48. When a metal is used for the diaphragm presser, a dimensional change of the diaphragm presser caused by temperature changes, and a dimensional change caused by stress applied to the diaphragm presser are alleviated, making higher-precision aperture regulation possible.

The coil spring 90 is housed in a holding part 52 formed between an inner peripheral surface of the casing 50 and the tubular part 51. While the coil spring 90 is used in this embodiment, the present invention is not necessarily limited thereto, and other types of springs can be used, such as a disc spring or a leaf spring. The coil spring 90 is continually compressed and, in the state illustrated in FIG. 1, a restoring force of a predetermined value (500 N, for example) is set so as to act on the casing 50 and the operation member 40.

The casing 50 is fixed to the bonnet 30 by screwing a lower end inner periphery thereof into a thread part 36 formed in an upper end outer periphery of the bonnet 30. Note that a bulkhead 63 having an annular shape is fixed between an upper end surface of the bonnet 30 and the casing 50.

Cylinder chambers C1, C2 vertically divided by the bulkhead 63 are formed between the outer peripheral surface of the operation member 40, and the casing 50 and the bonnet 30.

A piston 61 formed into an annular shape is fitted and inserted into the cylinder chamber C1 on an upper side, and a piston 62 formed into an annular shape is fitted and inserted into the cylinder chamber C2 on a lower side. These cylinder chambers C1, C2 and pistons 61, 62 constitute the main actuator 60 that produces a driving force that moves the operation member 40 in the opening direction A1. The main actuator 60 increases the area on which pressure acts by using the two pistons 61, 62, making it possible to boost the force resulting from the operation gas MG. A space on the upper side of the piston 61 of the cylinder chamber C1 communicates with the atmosphere by a ventilation path 53. A space on the upper side of the piston 62 of the cylinder chamber C2 communicates with the atmosphere by a ventilation path h1.

The spaces on the lower sides of the pistons 61, 62 of the cylinder chambers C1, C2, due to the supply of high pressure operation gas MG, are kept airtight by the O-rings OR. These spaces are respectively communicate with flow channels 41, 42 formed in the operation member 40. The flow channels 41, 42 communicate with a flow channel Ch formed between the inner peripheral surface of the operation member 40 and an outer peripheral surface of a case main body 101 of the piezoelectric actuator 100. This flow channel Ch communicates with a space SP defined by an upper end surface of the operation member 40, an outer peripheral surface of the disc spring receiver 145 having a cylindrical shape, the tubular part 51 of the casing 50, and a lower end surface of the regulating body 75. Then, a flow channel 141 formed in the actuator presser 140 having an annular shape connects the space SP, a through-hole 145h that passes through a central portion of the disc spring receiver 145, and a through-hole 71 that passes through a central portion of the regulating cap 70. The through-hole 71 of the regulating cap 70 is connected to a pipe (not illustrated) via the pipe joint 150.

The regulating cap 70 comprises a thread part 70a in an outer peripheral portion, and the thread part 70a is screwed into a screw hole 56 formed in an upper portion of the casing 50. The lock nut 78 is provided on an upper side of the regulating cap 70, and this lock nut 78 screws into the screw hole 56 and comes into contact with a contact surface of the regulating cap 70, thereby fixing a rotation position of the regulating cap 70. The regulating body 75 is provided on a lower side of the regulating cap 70 and, as illustrated in FIG. 1, is screwed and fitted into a thread part formed in an outer periphery of the regulating cap 70, and integrated with the regulating cap 70. The area between the regulating body 75 and the regulating cap 70, and the area between the regulating body 75 and the casing 50 are each sealed by the O-ring OR, and the space SP into which the operation gas MG is supplied is kept air-tight.

Two screw holes 72 are formed in the regulating cap 70, in symmetrical positions with respect to a central axis line of the regulating cap 70 in the opening and closing directions A1, A2, as illustrated in FIG. 1. The regulating rod 80 is inserted into the screw hole 72, and a thread part 81 formed on an upper end side of the regulating rod 80 is screwed into the screw hole 72. A recessed portion (not illustrated) that receives a tool and has, for example, a hexagon shape is formed in an upper end portion (head portion) of the regulating rod 80 so that the regulating rod 80 can be rotated from outside the valve device 1. As a result, the position of a regulating surface 80b described later can be regulated. An upper portion of the regulating cap 70 is also formed by machining into a shape into which a tool fits, and can be rotated using a tool from outside the valve device 1.

Note that, while the regulating cap 70, the regulating body 75, and the regulating rod 80 constitute a regulating mechanism of the present invention, details will be described later.

The piezoelectric actuator 100 is used for finely regulating the flow rate as described later, and includes piezoelectric elements (not illustrated) stacked on the case main body 101 having a cylindrical shape and illustrated in FIG. 4. The case main body 101 is made of a metal such as stainless alloy, and is closed on an end surface on a tip portion 102 side having a hemispherical shape, and on an end surface on a base end portion 103 side. Voltage is applied to the stacked piezoelectric elements, causing expansion, thereby elastically deforming the end surface on the tip portion 102 side of the case main body 101, and displacing the tip portion 102 having a hemispherical shape in the longitudinal direction. Given 2d as a maximum stroke of the stacked piezoelectric elements, a predetermined voltage V0 in which an expansion of the piezoelectric actuator 100 becomes d is applied in advance, bringing a total length of the piezoelectric actuator 100 to L0. Then, when a voltage higher than the predetermined voltage V0 is applied, the total length of the piezoelectric actuator 100 becomes L0+d at a maximum and, when a voltage lower than the predetermined voltage V0 (including no voltage) is applied, the total length of the piezoelectric actuator 100 becomes L0−d at a minimum. Accordingly, the total length from the tip portion 102 to the base end portion 103 can be expanded and contracted in the opening and closing directions A1, A2. Note that, while the tip portion 102 of the piezoelectric actuator 100 has a hemispherical shape in this embodiment, the shape is not necessarily limited thereto, and the tip portion may be a flat surface.

As illustrated in FIG. 1, electric power is supplied to the piezoelectric actuator 100 by a wiring 105. The wiring 105 passes through the through-hole 145h of the disc spring receiver 145, the through-hole 71 of the regulating cap 70, and the pipe joint 150, and is led outside.

The tip portion 102 of the piezoelectric actuator 100 comes into contact with a receiving surface 110a that is a conical recess formed on an upper surface of the actuator receiver 110 having a disc shape, as illustrated in FIG. 3. The actuator receiver 110 is moveable in the opening and closing directions A1, A2 with respect to the operation member 40. A plurality of the disc springs 120 having an annular shape are provided to an outer periphery of a columnar part 110c protruding from a central portion of the actuator receiver 110. The plurality of disc springs 120 are stacked so that the orientations are alternately reversed, and are continually compressed between a regulating surface 110b of the actuator receiver 110 and the disc spring receiver 48. Accordingly, the operation member 40 (disc spring receiver 48) continually receives the restoring force from the disc spring 120 in the closing direction A2, and the piezoelectric actuator 100 (actuator receiver 110) continually receives a restoring force in the opening direction A1. The restoring force of the disc spring 120 is set so as to become a predetermined value (150 N, for example) in the state illustrated in FIG. 3.

The base end portion 103 of the piezoelectric actuator 100, as illustrated in FIG. 1, comes into contact with the actuator presser 140, and the actuator presser 140 comes into contact with a lower end surface of the disc spring receiver 145. The disc spring receiver 145 is inserted into the regulating body 75, as illustrated in FIG. 2. The disc spring receiver 145, without being coupled to any member, is moveable in the opening and closing directions A1, A2.

As illustrated in FIG. 2, a plurality of the disc springs 130, each having an annular shape, are provided between a contact surface 145t of the disc spring receiver 145, and a lower surface 70b of the regulating cap 70. The plurality of disc springs 130 are fit into the outer periphery of a cylindrical part 73 of the regulating cap 70. The plurality of disc springs 130 are continually compressed between the contact surface 145t of the disc spring receiver 145, and the lower surface 70b of the regulating cap 70. The plurality of disc springs 130 are stacked so that two disc springs layered in the same orientation are alternately disposed in a reverse orientation. That is, pairs of two disc springs disposed in parallel are disposed in series. The disc spring 130 and the disc spring 120 are identical as a single disc spring, but an overall spring constant of the plurality of disc springs 130 is approximately twice that of the plurality of disc springs 120 due to the difference in the arrangement method. The disc spring receiver 145 is continually pressed in the closing direction A2 by the restoring force of the plurality of disc springs 130. The restoring force of the plurality of disc springs 130 is set so as to become a predetermined value (300 N, for example) in the state illustrated in FIG. 2.

With a contact surface 145b on the lower surface side of a protruding portion 145a formed on the upper end side of the disc spring receiver 145 coming into contact with a regulating surface 75t of the regulating body 75 by the restoring force of the disc spring 130 in the closing direction A2, the disc spring receiver 145 is regulated in terms of movement and thus positioned in the opening and closing directions A1, A2.

The disc spring receiver 145 is positioned in the position indicated in FIG. 2, thereby positioning the disc spring receiver 48 fixed to the operation member 40 in the position illustrated in FIG. 3. The position of the operation member 40 is regulated by the position of the disc spring receiver 145, that is, the position of the regulating body 75 (regulating cap 70).

In FIG. 3, P0 denotes a closed position of the operation member 40, P1 denotes a first open position, and P2 denotes a second open position. Lf1 denotes a lift amount between the closed position P0 and the first open position P1, and Lf2 denotes a lift amount between the first open position P1 and the second open position P2. Note that the position of the operation member 40 refers to the position of the contact surface 48t of the disc spring receiver 48 in the opening and closing directions A1, A2 with respect to the valve body 10. The lift amount Lf1 is regulated at a distance between the regulating surface 110b of the actuator receiver 110 and a contact surface 48t of the disc spring receiver 48 illustrated in FIG. 3. The lift amount Lf2 is regulated at a distance between the regulating surface 80b of the regulating rod 80 and the contact surface 145t of the disc spring receiver 145 illustrated in FIG. 2.

The restoring forces of the coil spring 90 and the disc spring 120 act on the diaphragm presser 38 in the closing direction A2, causing the diaphragm 20 to be pressed by the diaphragm presser 38. The diaphragm 20 then elastically deforms and is pressed against the valve seat 15, closing the valve. The restoring forces of the coil spring 90 and the disc spring 120 are, for example, approximately 650 N in total. That is, with the piston driving force of the main actuator 60 being lower than the restoring force of the coil spring 90 and disc spring 120, the operation member 40 is positioned in the closed position P0, and the flow paths 12, 13 are closed.

Figure 5:
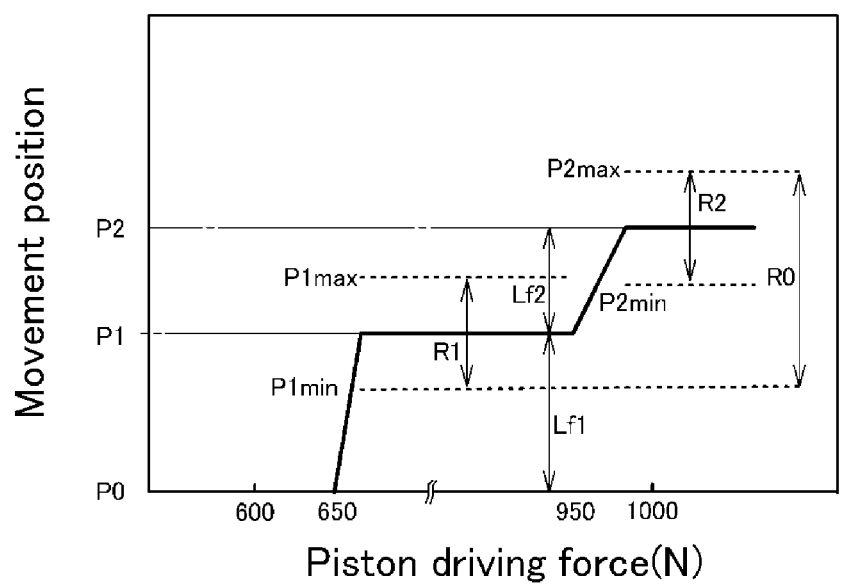
FIG. 5 is a graph showing a relationship between a piston driving force and a movement position of an operation member.

Here, FIG. 5 is a graph showing the relationship between a movement position of the operation member 40 and the piston driving force produced by the main actuator 60.

When the piston driving force produced by the main actuator 60 exceeds 650 N, for example, exceeding the restoring force of the coil spring 90 and the disc spring 120, the operation member 40 moves to the first open position P1 indicated in FIG. 5. In this embodiment, the main actuator 60 produces a driving force of approximately 700 N when the operating pressure of the operation gas MG is 0.45 MPa, and produces a driving force of approximately 1,000 N when the operating pressure of the operation gas MG is 0.7 MPa.

As illustrated in FIG. 5, when the piston driving force is within a range of approximately 700 N to 950 N, the operation member 40 is positioned in the first open position P1.

Figure 6:
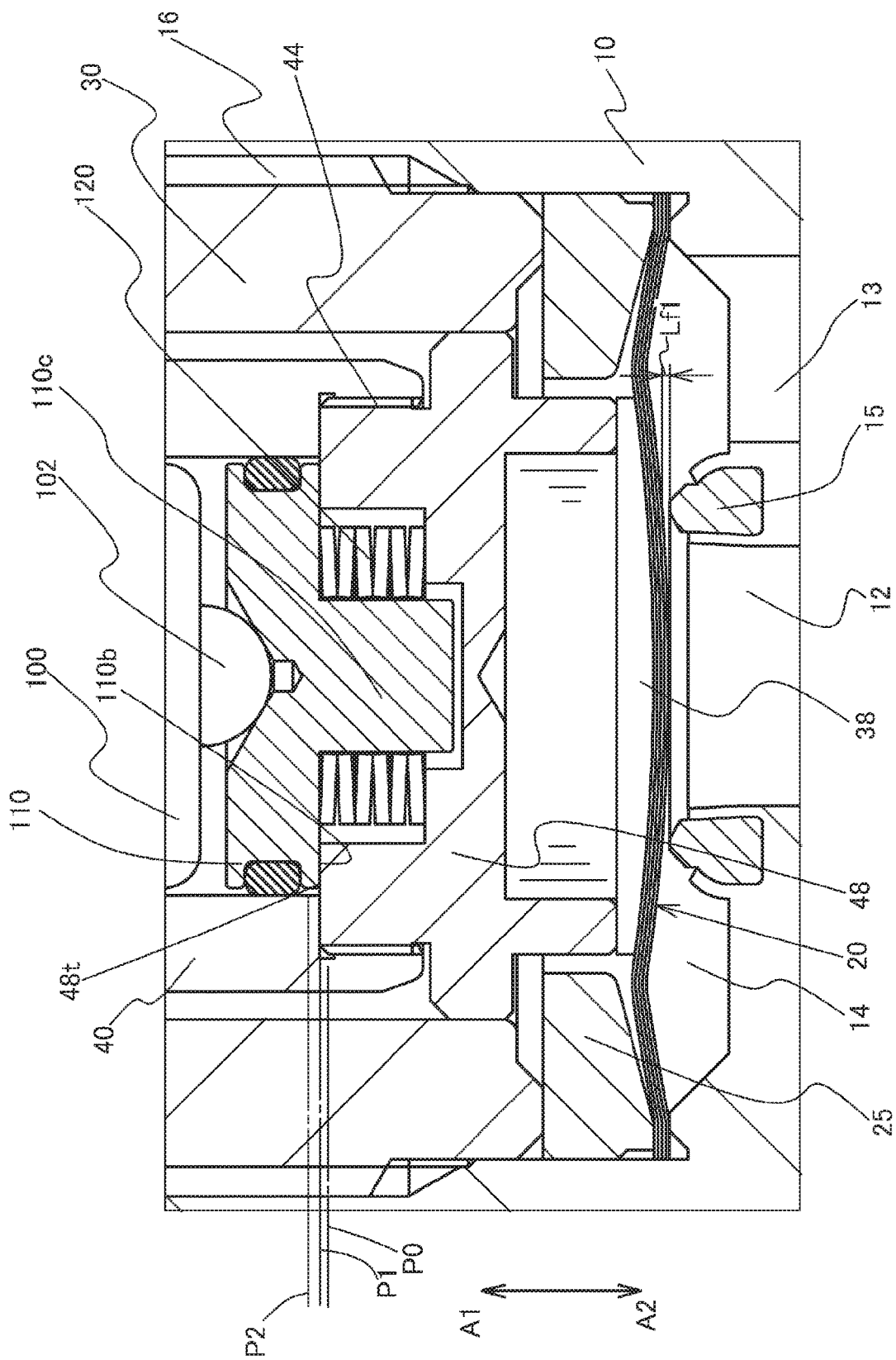
FIG. 6 is an enlarged sectional view of the lower side main part of the valve device in FIG. 1, in a first open position.

With the operation member 40 moved to the first open position P1, as illustrated in FIG. 6, the disc spring 120 is further compressed, the contact surface 48*t* of the disc spring receiver 48 comes into contact with the regulating surface 110*b* of the actuator receiver 110, movement of the operation member 40 in the opening direction A1 is regulated, and the operation member 40 is positioned in the first open position P1. As understood from FIG. 6, the diaphragm 20 separates from the valve seat 15 by the lift amount Lf1, opening the flow path.

When the operating pressure of the operation gas MG is raised to 0.7 MPa, the operation member 40 moves to the second open position P2 indicated in FIG. 5. That is, the total restoring force of the coil spring 90 and the disc springs 120, 130 is approximately 950 N and thus, when a piston driving force capable of acting against this value is produced, the operation member 40 moves to the second open position P2.

Figure 7:
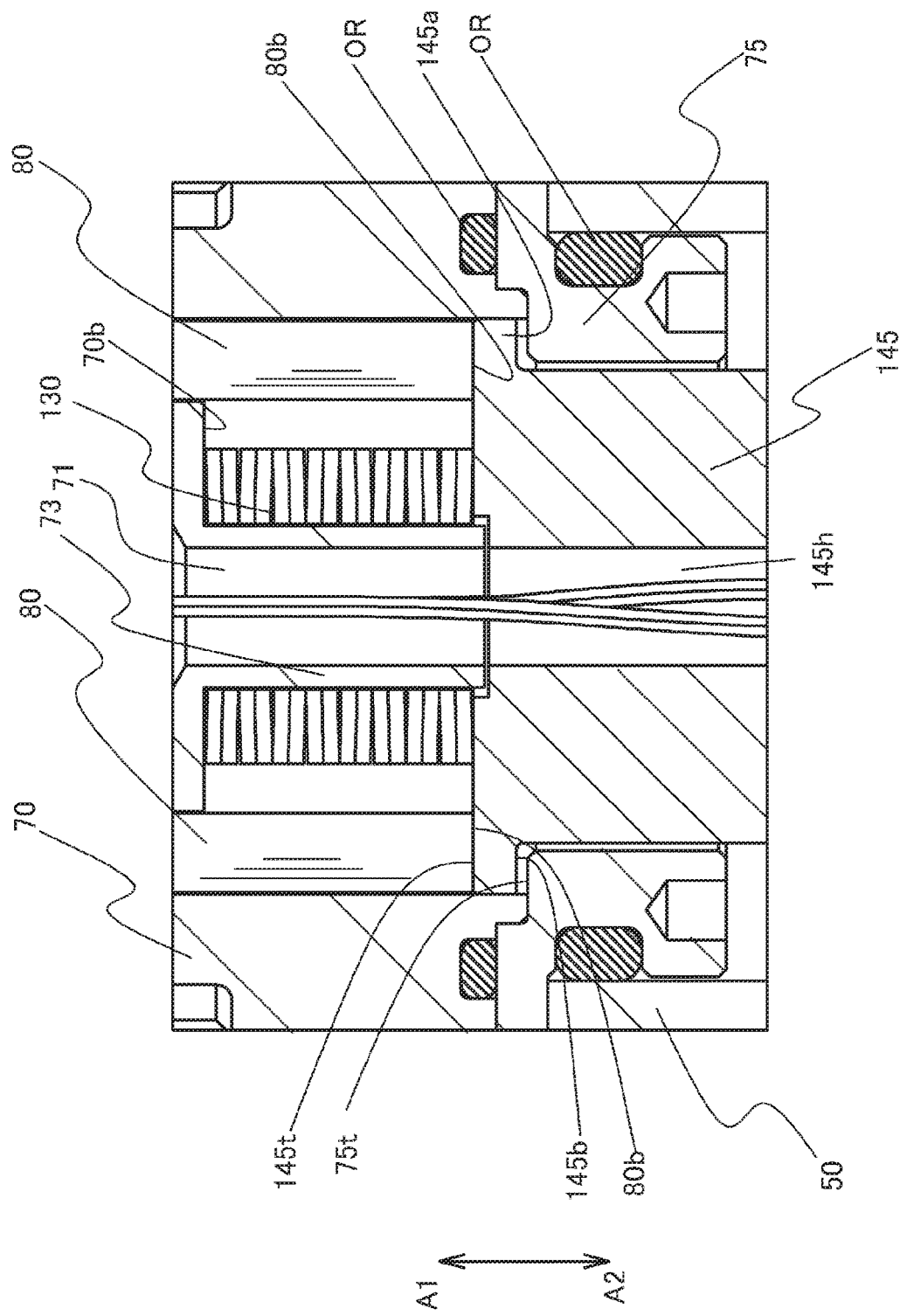
FIG. 7 is an enlarged sectional view of the upper side main part of the valve device in FIG. 1, in a second open position.
Figure 8:
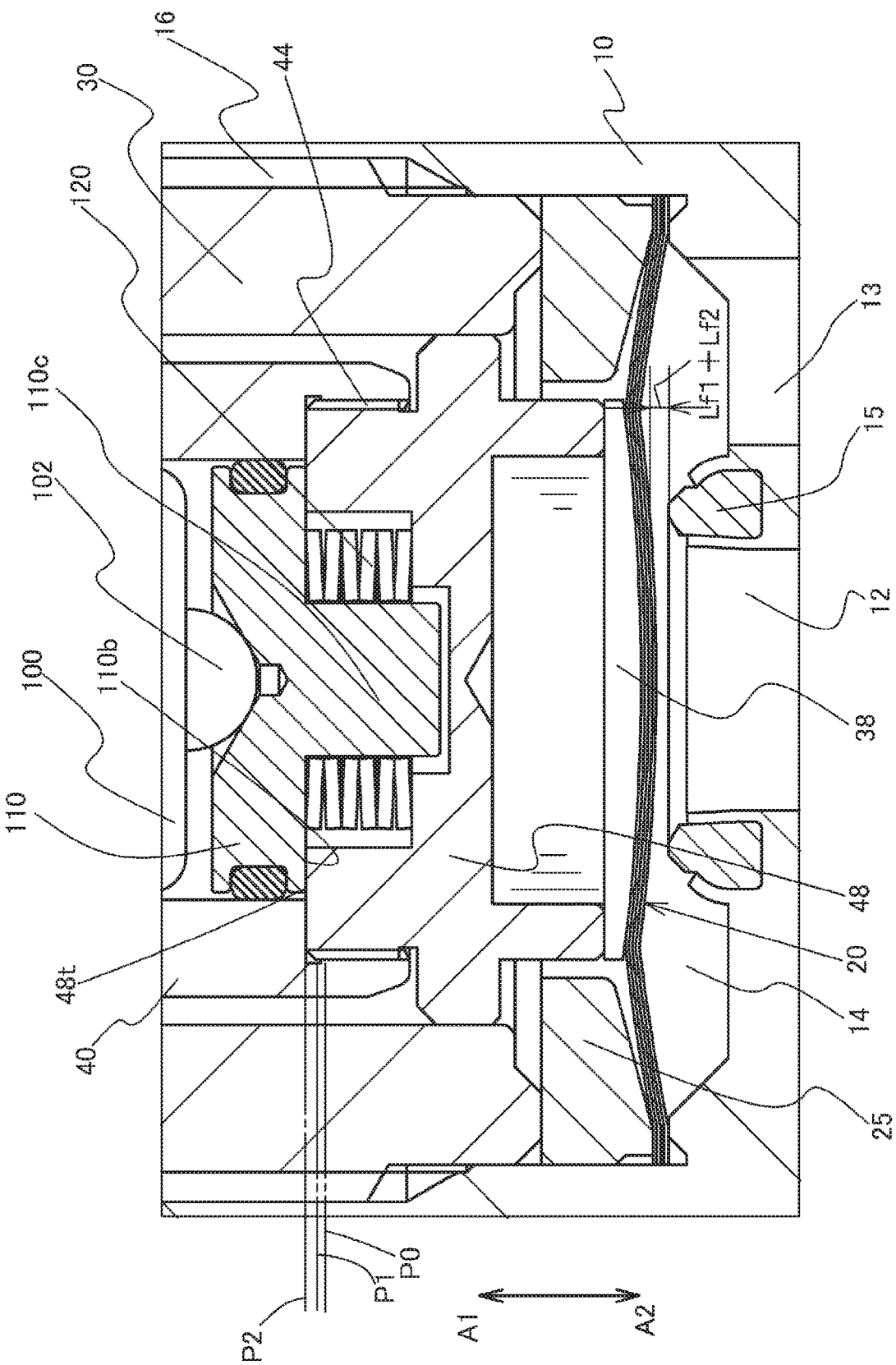
FIG. 8 is an enlarged sectional view of the lower side main part of the valve device in FIG. 1, in a second open position.

With the operation member 40 moved to the second open position P2, as illustrated in FIG. 7, the disc spring receiver 145 is pressed up in the opening direction A1, the disc spring 130 is further compressed, the contact surface 145*t* of the disc spring receiver 145 comes into contact with the regulating surface 80*b* of the regulating rod 80, and movement of the disc spring receiver 145 in the opening direction A1 is regulated. As a result, as illustrated in FIG. 8, the contact surface 48*t* of the disc spring receiver 48 is positioned in the second open position P2, and the diaphragm 20 separates from the valve seat 15 by the lift amount Lf1+Lf2, further opening the flow path.

As described above, the valve device 1 according to this embodiment, comprises a switching mechanism capable of switching the open position of the operation member 40 in two stages in accordance with the operating pressure of the operation gas MG using the disc springs 120, 130 having different spring constants. While significant man-hours are required to greatly change the degree of opening using a regulating screw, in this embodiment, the required degree of opening can be easily selected by changing the operating pressure of the operation gas MG.

Next, the regulating mechanism of the valve device 1 will be described.

While the first open position P1 and the second open position P2 indicated in FIG. 5 are mechanically regulated as described above, the degree of opening (flow rate) of the valve device 1 needs to be regulated in the initial stage and the like of the manufacturing process.

In the valve device 1, as illustrated in FIG. 5, the position of the first open position P1 is regulatable within a regulatable range R1 of an upper limit value P1max and a lower limit value P1min by regulating the position of the regulating cap 70 in the opening and closing directions A1, A2. Further, the position of the second open position P2 is regulatable within a regulatable range R2 of an upper limit value P2max and a lower limit value P2min by regulating the positions of the regulating surfaces 80*b* of the two regulating rods 80 in the opening and closing directions A1, A2.

Here, the regulatable range R1 and the regulatable range R2, as illustrated in FIG. 5, partially overlap, making it possible to continually regulate the open position of the operation member 40 within a full regulatable range R0 obtained by combining the regulatable range R1 and the regulatable range R2. Note that the regulatable range R1 and the regulatable range R2 may be separated.

In this embodiment, when a regulating pitch of the regulating cap 70 and the regulating rod 80 is maintained in the same way as in the related art, two regulating ranges of the regulating cap 70 and the regulating rod 80 are obtained, making it possible to expand the flow regulating range. Further, when the regulating pitch of the regulating cap 70 and the regulating rod 80 is reduced by half compared to that in the related art, the flow regulating accuracy is doubled and higher-precision flow regulation is possible.

Furthermore, in this embodiment, as illustrated in FIG. 6 and FIG. 8, the first open position P1 and the second open position P2 can be regulated while maintaining the diaphragm 20 in an elastically deformed state, making higher-precision regulation of the degree of opening as well as appropriate regulation of the degree of opening (regulation of a displacement amount of the diaphragm 20), and extension of a service life of the diaphragm 20 possible. In addition, regulation can be performed using the regulating cap 70 and the regulating rod 80, making it possible to cope with change over time of the diaphragm 20 as well.

Next, fine regulation of the flow rate by the piezoelectric actuator 100 will be described with reference to FIG. 9A to FIG. 10B.

Even higher-precision flow regulation is possible by using the piezoelectric actuator 100 in addition to the regulating cap 70 and the regulating rod 80, making flow regulation during the operation of the valve device 1 possible.

The left side of the center line Ct in FIG. 9A to FIG. 10B indicates a state in which the operation member 40 is positioned in the first open position P1 or the second open position P2, and the right side of the center line Ct indicates the state after the position of the operation member 40 in the opening and closing directions A1, A2 is finely regulated, as illustrated in FIG. 6 and FIG. 8.

Figure 9A:
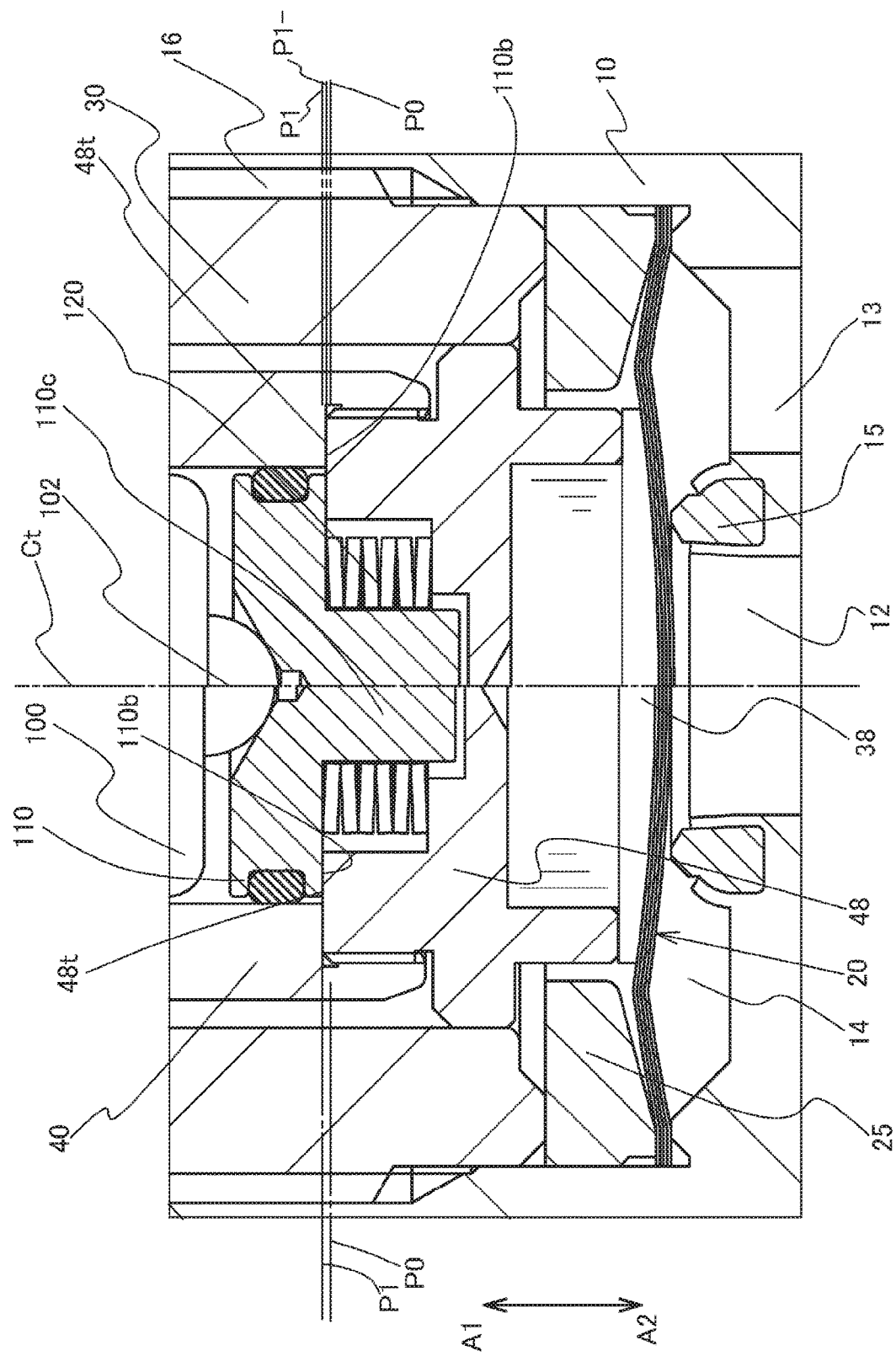
FIG. 9A is an enlarged sectional view of the lower side main part for explaining a fine regulating operation of a flow rate by the piezoelectric actuator from the first open position (during flow decrease).
Figure 10A:
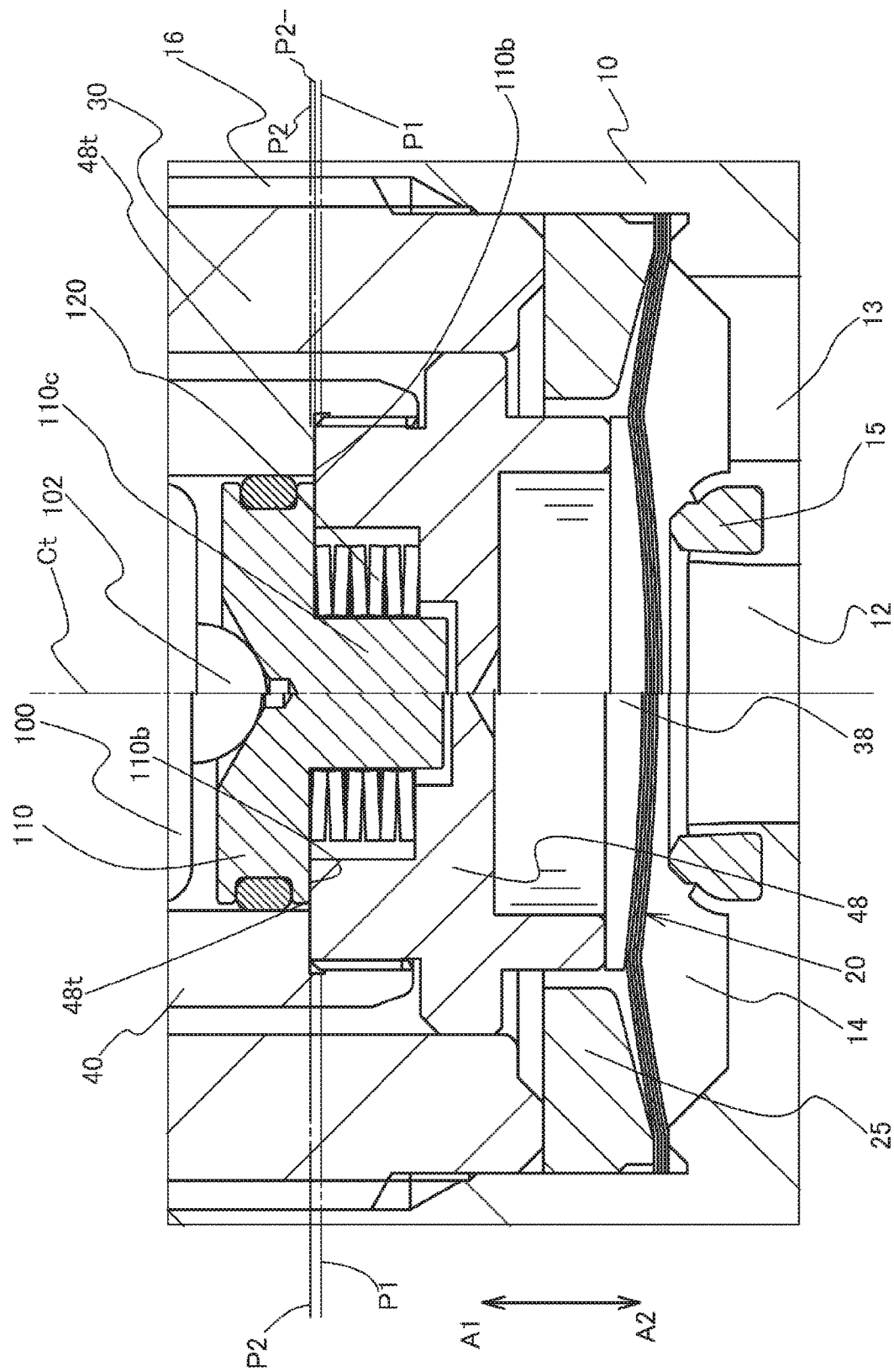
FIG. 10A is an enlarged sectional view of the lower side main part for explaining the fine regulating operation of the flow rate by the piezoelectric actuator from the second open position (during flow decrease).

When regulation is made in the direction that decreases the flow rate of the fluid, the piezoelectric actuator 100 is expanded and the operation member 40 is moved in the closing direction A2, as illustrated in FIG. 9A or FIG. 10A. As a result, the first open position P1 and the second open position P2 of the operation member 40 are respectively corrected to P1− and P2−.

Figure 9B:
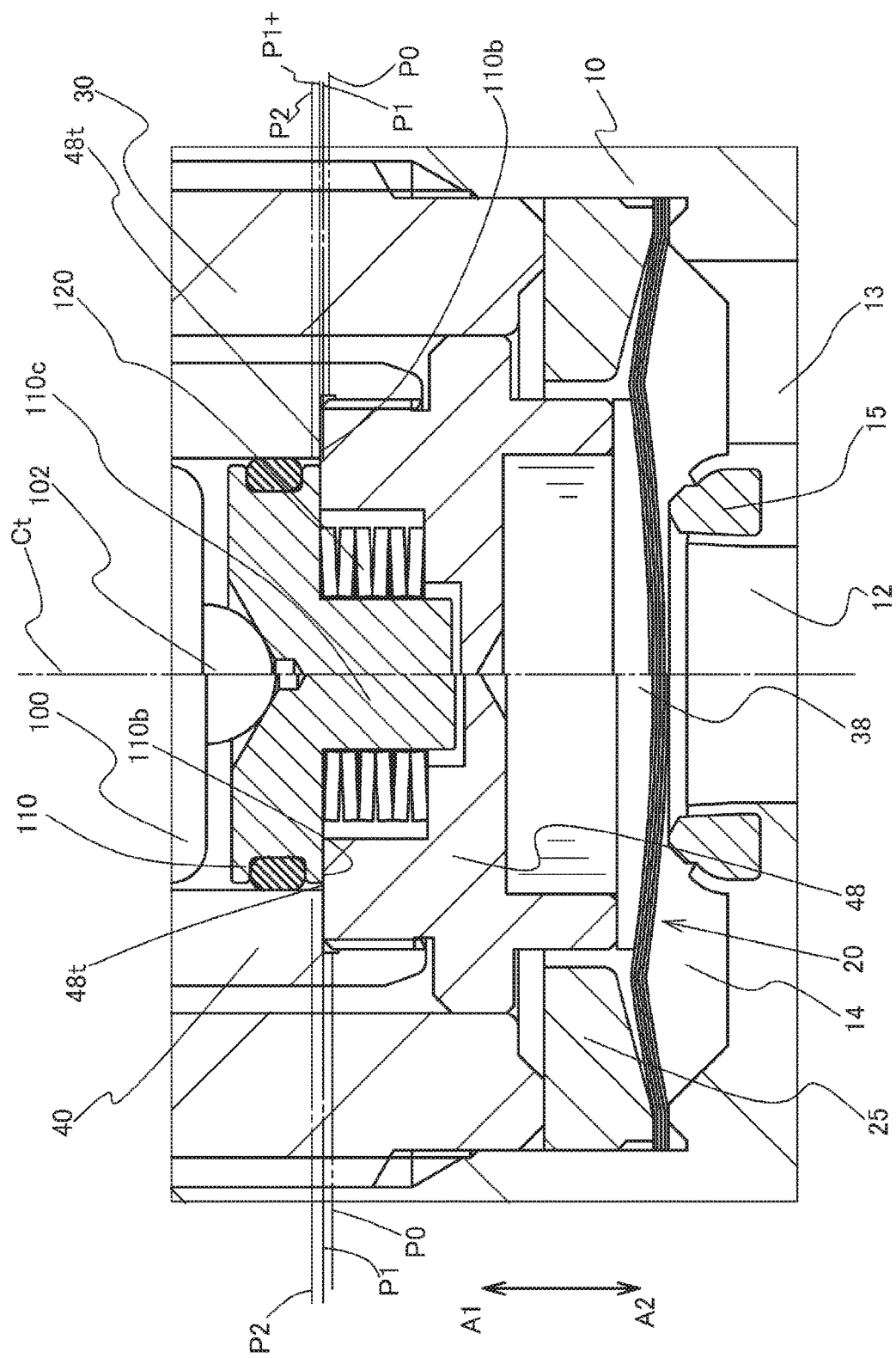
FIG. 9B is an enlarged sectional view of the lower side main part for explaining the fine regulating operation of the flow rate by the piezoelectric actuator from the first open position (during flow increase).
Figure 10B:
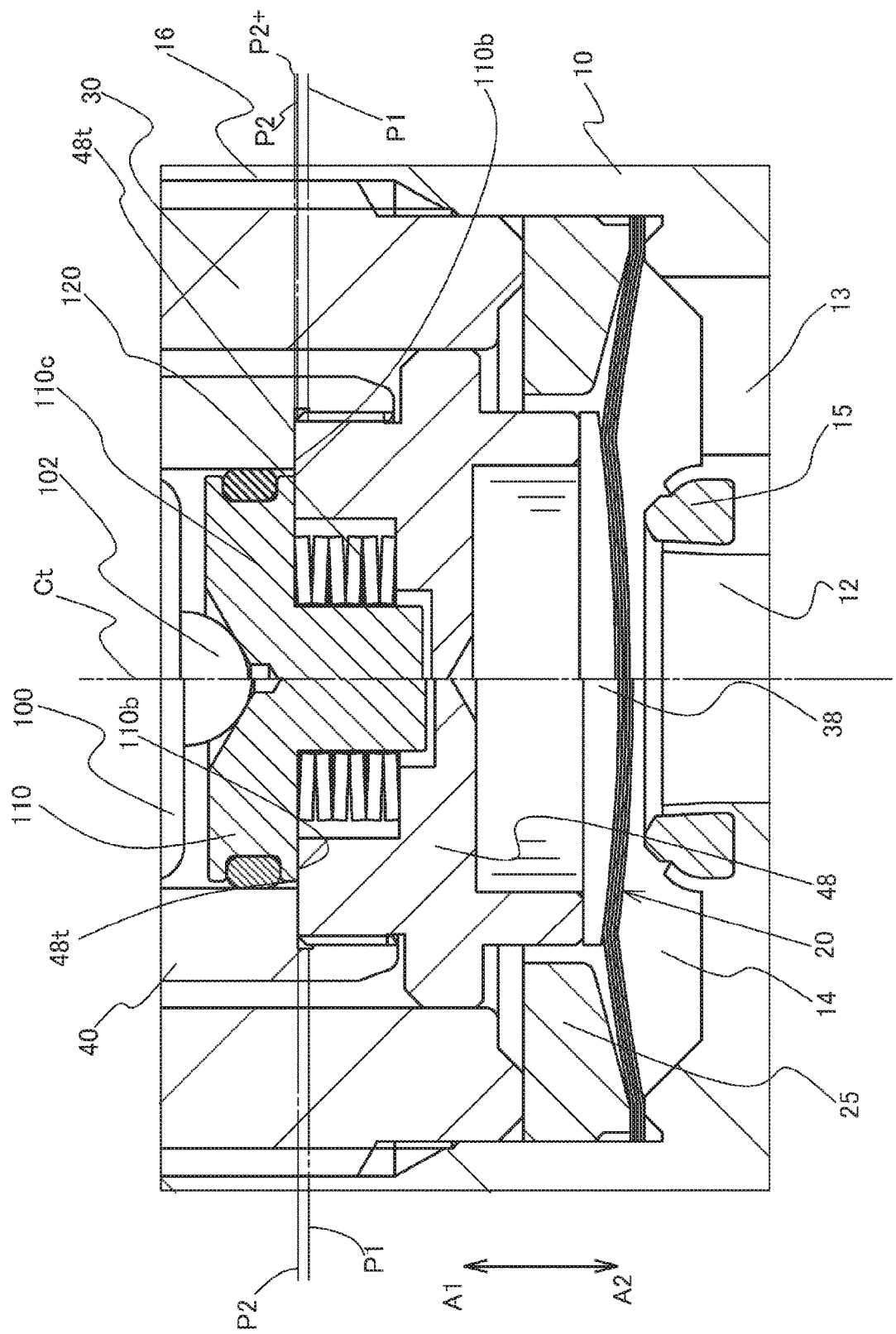
FIG. 10B is an enlarged sectional view of the lower side main parts for explaining the fine regulating operation of the flow rate by the piezoelectric actuator from the second open position (during flow increase).

When regulation is made in the direction that increases the flow rate of the fluid, the piezoelectric actuator 100 is contracted and the operation member 40 is moved in the opening direction A1, as illustrated in FIG. 9B or FIG. 10B.

As a result, the first open position P1 or the second open position P2 of the operation member 40 is respectively corrected to P1+ or P2+.

In this embodiment, the maximum value of the lift amount of the diaphragm 20 is about 100 to 300 μm and the regulated amount by the piezoelectric actuator 100 is about ±30 μm.

That is, the lift amount of the diaphragm 20 is regulated across the full range using the regulating cap 70 and the regulating rod 80, and further finely regulated by the expansion and contraction of the piezoelectric actuator 100.

According to this embodiment, precise flow regulation is possible by simply changing the voltage applied to the piezoelectric actuator 100, making it possible to immediately regulate and, in real-time, control the flow rate.

Next, an application example of the valve device 1 described above will be described with reference to FIG. 11.

Figure 11:
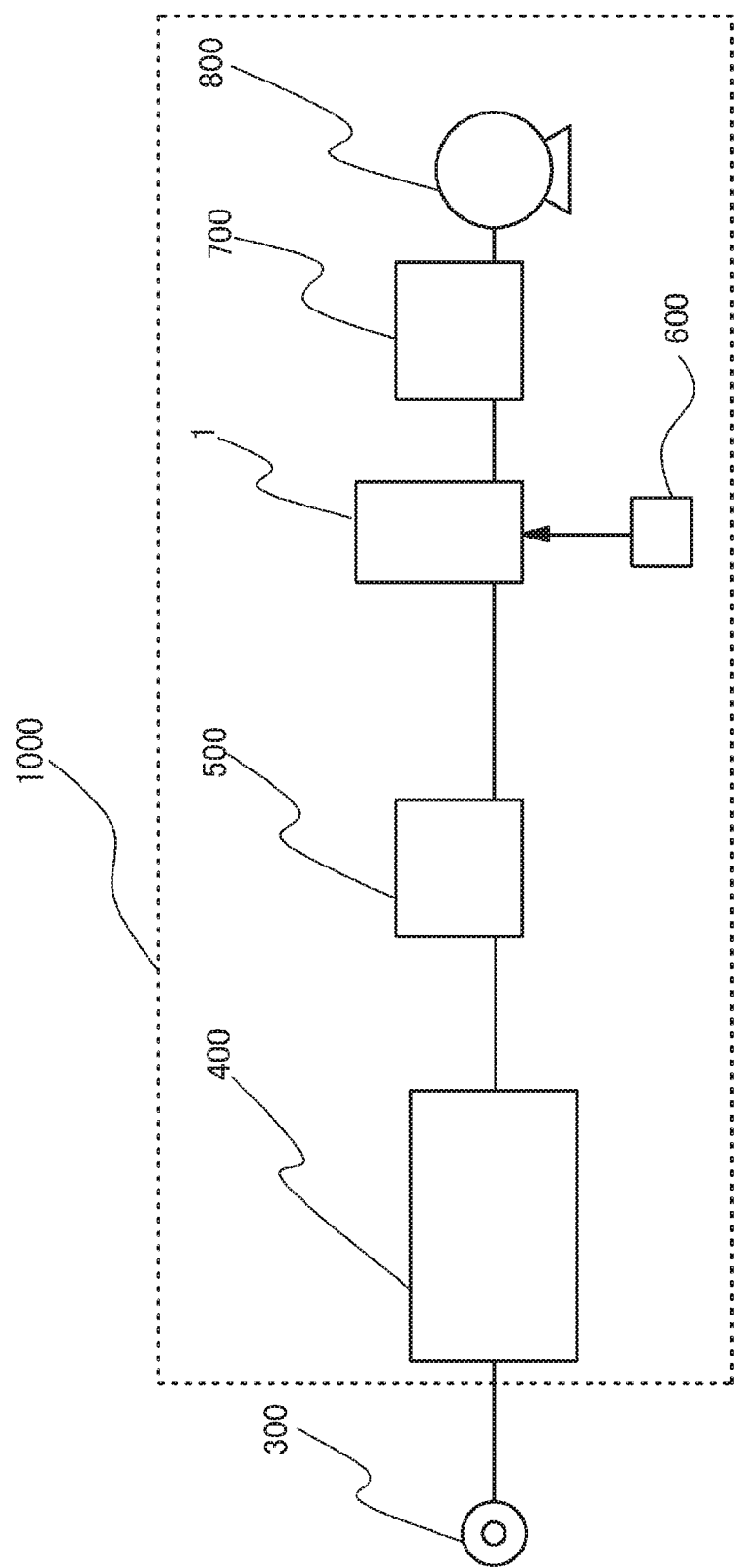
FIG. 11 is a schematic drawing illustrating an application example of a semiconductor manufacturing process of the valve device according to an embodiment of the present invention.

A system illustrated in FIG. 11 is a semiconductor manufacturing system 1000 for executing a semiconductor manufacturing process by the ALD method, with 300 denoting a process gas supply source, 400 denoting a gas box, 500 denoting a tank, 600 denoting a control unit, 700 denoting a processing chamber, and 800 denoting an exhaust pump.

In the semiconductor manufacturing process based on the ALD method, the flow rate of the process gas needs to be precisely regulated and a certain amount of flow rate needs to be secured to a certain extent by increasing a size of a diameter of the substrate.

The gas box 400 is an integrated gas system (a fluid control system) in which various fluid control devices, such as a switch valve, a regulator, and a mass flow controller, are integrated and housed in a box to supply an accurately measured process gas to the processing chamber 700.

The tank 500 functions as a buffer for temporarily storing the process gas supplied from the gas box 400.

The control unit 600 controls the supply of the operation gas MG to the valve device 1, and the flow regulation by the piezoelectric actuator 100.

The processing chamber 700 provides a sealed treatment space for forming a film on the substrate by the ALD method.

The exhaust pump 800 draws a vacuum inside the processing chamber 700.

In the initial setting of the valve device 1, of the first open position P1 and the second open position P2, the open position to be used is selected, and the operation gas MG of an operating pressure corresponding thereto is supplied. Further, the process gas flow rate is regulated using the regulating cap 70 or the regulating rod 80, and the flow rate can be regulated while the fluid is allowed to flow through the flow path.

Furthermore, even when the flow rate of the process gas needs to be greatly changed during the film formation process, the regulation can be easily performed by changing the operating pressure of the operation gas MG supplied to the valve device 1.

While a case where the valve device 1 is used in a semiconductor manufacturing process based on the ALD method is illustrated in the above-described application example, the present invention is not necessarily limited thereto, and can be applied to various targets that require precise flow regulation, such as an atomic layer etching (ALE) method, for example.

While a piston built into a cylinder chamber activated by gas pressure is used as the main actuator in the above-described embodiment, the present invention is not necessarily limited thereto, and another type of actuator, such as an actuator activated by hydraulic pressure, for example, can also be selected.

While the disc spring is used as the switching mechanism in the above-described embodiment, the present invention is not necessarily limited thereto, and other elastic members, such as a coil spring, can also be adopted.

While a so-called normally closed type valve is given as an example in the above-described embodiment, the present invention is not necessarily limited thereto and can be applied to a normally open type valve as well. In this case, for example, when the valve element is closed by the driving force of the main actuator, and the valve is opened by the force of the spring, the position of the operation member (valve element) may be switched to two stages in accordance with the operating pressure of the operation gas MG.

While the diaphragm is illustrated as the valve element in the above-described embodiment, the present invention is not necessarily limited thereto, and other types of valve elements can also be adopted.

While, in the configuration of the above-described embodiment, the valve device 1 is disposed outside the gas box 400 serving as a fluid control system, the valve device 1 of the above-described embodiment can also be included in a fluid control system in which various fluid devices, such as a switch valve, a regulator, and a mass flow controller, are integrated and housed in a box.

DESCRIPTIONS OF REFERENCE NUMERALS

1 Valve device
10 Valve body
15 Valve seat
20 Diaphragm
25 Pressing adapter
30 Bonnet
38 Diaphragm presser
40 Operation member
45 Spring receiving plate
48 Disc spring receiver
50 Casing
60 Main actuator
61, 62 Piston
63 Bulkhead
70 Regulating cap (Regulating mechanism)
70a Thread part
71 Through-hole
72 Screw hole
75 Regulating body (Regulating mechanism)
78 Lock nut
80 Regulating rod (Regulating mechanism)
80b Regulating surface
81 Thread part
90 Coil spring
100 Piezoelectric actuator
101 Case main body
102 Tip portion
103 Base end portion
105 Wiring
110 Actuator receiver
110b Regulating surface
120, 130 Disc spring (Switching mechanism)
140 Actuator presser
141 Flow channel
145 Disc spring receiver
150 Pipe joint
300 Process gas supply source 400 Gas box
500 Tank
600 Control unit
700 Processing chamber
800 Exhaust pump
1000 Semiconductor manufacturing system
A1 Opening direction
A2 Closing direction
C1, C2 Cylinder chamber
Ch Flow channel
SP Space
P0 Closed position
P1 First open position
P2 Second open position
R1, R2 Regulatable range
R0 Full regulatable range
OR O-ring
MG Operation gas
Lf1, Lf2 Lift amount

What is claimed is:

1. A valve device comprising:
a valve body that defines a flow path;
a valve element configured to open and close the flow path;
an operation structure configured to move the valve element in opening and closing directions;
a main actuator that applies a driving force corresponding to an applied operating pressure to the operation structure;
a switching mechanism capable of selectively switching a position of the operation structure that regulates a degree of opening of the flow path between a first open position and a second open position that differ from each other, in accordance with a magnitude of the operating pressure;
a regulator mechanism configured to independently regulate a first open position of the operation structure and a second open position of the operation structure; and
a regulating actuator configured to adjust a position of the operation structure positioned at the first or the second open position, wherein
the regulator mechanism has a closing direction regulating surface that regulates movement of a base end portion of the regulating actuator toward the closing direction and an opening direction regulating surface that regulates movement of the base end portion toward the opening direction,
the switching mechanism comprises:
a first elastic or spring structure provided between a tip end portion of the regulating actuator and the operation structure and biasing the operation structure to leave from the tip end portion of the regulating actuator; and
a second elastic or spring structure provided between the regulator mechanism and the base end portion of the regulating actuator and biasing the base end portion of the regulating actuator to leave from the opening direction regulating surface and abut the closing direction regulating surface of the regulator mechanism;
the valve device being configured such that:
when the main actuator applies a driving force corresponding to a first magnitude of the operating pressure to the operation structure, the second elastic or spring structure exerts a restoring force and brings the base end portion of the regulating actuator to an abutting position against the closing direction regulating surface, and the first elastic or spring structure compresses to allow the operation structure to abut against the tip end portion of the regulating actuator to position the operation structure at the first open position, and
when the main actuator applies a driving force corresponding to a second magnitude of the operating pressure to the operation structure, the second elastic or spring structure compresses to bring the base end portion of the regulating actuator to an abutting position against the opening direction regulating surface, and the first elastic or spring structure compresses to allow the operation structure to abut against the tip end portion of the regulating actuator to position the operation structure at the second open position.

2. The valve device according to claim 1, wherein
a regulatable range of the first open position and a regulatable range of the second open position of the regulator mechanism partially overlap.

3. The valve device according to claim 1, wherein
the regulator mechanism is configured to be operable while a fluid is allowed to flow through the flow path.

4. The valve device according to claim 1, wherein:
the valve element comprises a diaphragm; and
the operation structure positioned at the first open position or the second open position maintains the diaphragm in a corresponding elastically deformed state.

5. A flow control method for controlling a flow rate of a fluid using the valve device described in claim 1.

6. A semiconductor manufacturing method comprising using the valve device as defined in claim 1 for flow control of a process gas in a manufacturing process of a semiconductor device that requires a treatment process by the process gas in a sealed chamber.

7. A fluid control system comprising:
a plurality of fluid devices, wherein:
the fluid devices include the valve device as defined in claim 1.

8. A semiconductor manufacturing system comprising the valve device as defined in claim 1 for control of a process gas in a manufacturing process of a semiconductor device that requires a treatment process by the process gas in a sealed chamber.

9. The valve device according to claim 1, wherein
the first elastic or spring structure and the second elastic or spring structure include different spring constants.

10. The valve device according to claim 1, wherein
the main actuator includes a piston and a coil spring that applies a pressing force to the operation structure in the closing direction via the piston, and
the operating pressure applied to the piston applies a driving force to the operation structure in the opening direction against the pressing force of the coil spring.

* * * * *